United States Patent
Ochs

(10) Patent No.: US 11,009,308 B2
(45) Date of Patent: May 18, 2021

(54) ARCHERY BOW SUPPORT DEVICE

(71) Applicant: Jason Ochs, Ellisville, MO (US)

(72) Inventor: Jason Ochs, Ellisville, MO (US)

( * ) Notice: Subject to any disclaimer, the term of this patent is extended or adjusted under 35 U.S.C. 154(b) by 2 days.

(21) Appl. No.: 15/911,000

(22) Filed: Mar. 2, 2018

(65) Prior Publication Data

US 2018/0313631 A1    Nov. 1, 2018

Related U.S. Application Data

(60) Provisional application No. 62/490,167, filed on Apr. 26, 2017.

(51) Int. Cl.

| F41B 5/14 | (2006.01) |
|---|---|
| A45F 5/02 | (2006.01) |
| A45F 5/00 | (2006.01) |
| A01M 31/02 | (2006.01) |
| F41B 5/06 | (2006.01) |
| F41B 5/10 | (2006.01) |

(52) U.S. Cl.
CPC ........... *F41B 5/1453* (2013.01); *A01M 31/02* (2013.01); *A45F 5/00* (2013.01); *A45F 5/02* (2013.01); *A45F 5/021* (2013.01); *F41B 5/14* (2013.01); *F41B 5/1461* (2013.01); *A45F 2005/025* (2013.01); *A45F 2200/0591* (2013.01); *F41B 5/063* (2013.01); *F41B 5/10* (2013.01); *F41B 5/1426* (2013.01)

(58) Field of Classification Search
CPC ........ F41B 5/14; F41B 5/1461; F41B 5/1453; F41B 5/10; A45F 5/021; A45F 2200/0575; A45F 5/02; A45F 2200/0583; A45F 5/00; F16M 11/041; F16M 13/00; B44D 3/123

USPC .......................................... 224/904

See application file for complete search history.

(56) References Cited

U.S. PATENT DOCUMENTS

| 2,926,403 | A | * | 3/1960 | Weissman | ................ | B41K 1/58 |
|---|---|---|---|---|---|---|
| | | | | | | 224/247 |
| 2,985,349 | A | * | 5/1961 | McGuire | ................. | B44D 3/14 |
| | | | | | | 224/268 |
| 3,156,388 | A | * | 11/1964 | Simmons | ................ | B25H 3/00 |
| | | | | | | 224/242 |
| 3,157,927 | A | * | 11/1964 | Roden | ....................... | A45F 5/02 |
| | | | | | | 24/3.7 |
| 3,168,971 | A | * | 2/1965 | Goertzen | .............. | F41B 5/1461 |
| | | | | | | 124/23.1 |
| 3,187,902 | A | * | 6/1965 | Nelson | ...................... | B25H 3/04 |
| | | | | | | 211/70.6 |
| 3,208,653 | A | * | 9/1965 | Wallace | .................... | F41B 5/14 |
| | | | | | | 224/222 |
| 3,232,501 | A | * | 2/1966 | Merenda | .............. | F41B 5/1461 |
| | | | | | | 124/23.1 |
| 3,294,298 | A | * | 12/1966 | Danielson | ................ | A45F 5/00 |
| | | | | | | 224/666 |

(Continued)

*Primary Examiner* — Jonathan Liu
*Assistant Examiner* — Taylor L Morris
(74) *Attorney, Agent, or Firm* — David H. Chervitz

(57) ABSTRACT

An archery bow support device is disclosed having a clip portion have a front leg having a front surface and a back leg and a support bracket connected to the front surface of the front leg and extending outwardly from the front leg. An archery bow support device having a clip portion have a front leg having a front surface and an end portion and a back leg and a support bracket connected to the end portion of the front leg by a hinge device for allowing the support bracket to pivot relative to the front leg and the support bracket extending outwardly from the front leg is also disclosed.

7 Claims, 7 Drawing Sheets

(56) References Cited

U.S. PATENT DOCUMENTS

| | | | | |
|---|---|---|---|---|
| 3,434,638 | A * | 3/1969 | Beynon | F41B 5/063 224/197 |
| 3,599,847 | A * | 8/1971 | Danielson | A45F 5/02 224/673 |
| 3,653,624 | A * | 4/1972 | Abel | A61G 7/0503 248/312 |
| 3,990,617 | A * | 11/1976 | Carter | A45F 5/02 224/251 |
| 4,014,453 | A * | 3/1977 | Tarnacki | B44D 3/123 220/697 |
| 4,040,547 | A * | 8/1977 | Dickey | F16M 13/04 224/247 |
| 4,056,218 | A * | 11/1977 | Barna | A45F 5/021 224/255 |
| 4,100,652 | A * | 7/1978 | Carlson | A63B 55/00 24/3.1 |
| D248,797 | S * | 8/1978 | Sanders | 224/269 |
| 4,103,807 | A * | 8/1978 | Lyon | F41B 5/1461 124/23.1 |
| 4,121,798 | A * | 10/1978 | Schumacher | A47L 13/512 24/336 |
| 4,144,971 | A * | 3/1979 | Balibrea | F41A 23/18 211/64 |
| 4,360,179 | A * | 11/1982 | Roberts | F41B 5/14 124/23.1 |
| 4,377,270 | A * | 3/1983 | Kolongowski | F16M 13/00 248/441.1 |
| 4,419,794 | A * | 12/1983 | Horton, Jr. | A45F 5/02 224/197 |
| 4,587,818 | A * | 5/1986 | Griffin | A45F 5/02 224/255 |
| 4,588,116 | A * | 5/1986 | Litman | A45F 5/02 224/672 |
| 4,598,027 | A * | 7/1986 | Johnson | A45F 5/02 156/212 |
| 4,638,530 | A * | 1/1987 | Perry | A45F 5/02 224/904 |
| 4,684,047 | A * | 8/1987 | Burgwin | A45F 5/02 224/248 |
| D291,746 | S * | 9/1987 | Evans | D3/228 |
| 4,699,303 | A * | 10/1987 | Kline | A63B 55/408 224/667 |
| 4,790,461 | A * | 12/1988 | Stover | A45F 5/00 224/234 |
| 4,821,934 | A * | 4/1989 | Alessi | A45F 5/02 224/667 |
| D301,286 | S * | 5/1989 | Hird | A45F 5/021 D21/794 |
| 4,830,244 | A * | 5/1989 | Brannon | A01K 65/00 224/103 |
| 4,830,247 | A * | 5/1989 | Banks | B25H 3/006 211/70.6 |
| 4,896,806 | A * | 1/1990 | Sanchez, Jr. | A01K 97/10 224/200 |
| 4,974,764 | A * | 12/1990 | Cantwell | A45F 5/02 224/269 |
| 5,025,587 | A * | 6/1991 | Creed | A01K 65/00 224/103 |
| 5,106,044 | A * | 4/1992 | Regard, III | F41B 5/14 124/23.1 |
| 5,183,231 | A * | 2/1993 | Pellerin | F41B 5/14 124/23.1 |
| 5,215,070 | A * | 6/1993 | Brown | F41B 5/066 124/25.7 |
| 5,232,136 | A * | 8/1993 | Unger | A45F 5/02 224/247 |
| 5,331,721 | A * | 7/1994 | Raum, Sr. | A44B 99/00 224/269 |
| 5,332,090 | A * | 7/1994 | Tucker | A63B 55/408 206/315.3 |
| 5,341,975 | A * | 8/1994 | Marinescu | A45F 5/02 224/269 |
| 5,341,976 | A * | 8/1994 | Rider | A45F 5/02 206/371 |
| 5,482,241 | A | 1/1996 | Oglesby | |
| 5,511,705 | A * | 4/1996 | Dreszer | A45F 5/02 224/666 |
| 5,571,228 | A * | 11/1996 | McMurtrie | A01K 97/10 43/21.2 |
| 5,636,734 | A * | 6/1997 | Smith | A63B 55/40 206/315.2 |
| 5,687,892 | A * | 11/1997 | Johns | A45F 5/02 224/268 |
| 5,697,537 | A * | 12/1997 | Bowlsby | A45F 5/02 224/268 |
| 5,699,943 | A * | 12/1997 | Schaefer | A45F 5/02 16/335 |
| 5,775,658 | A * | 7/1998 | Englehardt | F41B 5/14 124/23.1 |
| 5,857,651 | A * | 1/1999 | Kunevicius | F41B 5/14 248/218.4 |
| 5,944,238 | A * | 8/1999 | Stark | A45F 5/02 220/287 |
| 5,944,242 | A * | 8/1999 | Musarella | A45F 5/02 224/270 |
| 6,019,335 | A * | 2/2000 | Sehati | A45F 5/02 224/148.4 |
| 6,053,383 | A * | 4/2000 | Gunderson | A45F 3/14 108/43 |
| 6,086,026 | A * | 7/2000 | Pearce | F41B 5/14 211/13.1 |
| 6,089,426 | A * | 7/2000 | Brandow | F41A 23/18 224/268 |
| 6,105,566 | A * | 8/2000 | Tiedemann | F41B 5/066 124/25.7 |
| 6,131,779 | A * | 10/2000 | Gendala | A45F 5/02 224/148.1 |
| 6,193,119 | B1 * | 2/2001 | Schwarm | A45F 5/021 224/197 |
| 6,193,125 | B1 * | 2/2001 | Grover | A45F 5/02 224/195 |
| 6,206,543 | B1 * | 3/2001 | Henry | A45F 5/02 362/103 |
| 6,244,556 | B1 * | 6/2001 | Carrillo | F41B 5/14 182/187 |
| D444,706 | S * | 7/2001 | Giancaspro | D3/229 |
| 6,253,484 | B1 * | 7/2001 | O'Connor | A01K 97/10 248/213.2 |
| D459,848 | S * | 7/2002 | Anderson | D32/54 |
| 6,419,194 | B1 * | 7/2002 | LoSacco | A46B 17/02 248/110 |
| 6,508,390 | B1 * | 1/2003 | Karpati | A45F 5/00 224/200 |
| 6,510,592 | B1 * | 1/2003 | Hamilton | A44B 11/06 24/170 |
| 6,540,122 | B1 * | 4/2003 | Petersen | A45F 5/02 224/197 |
| 6,557,739 | B1 * | 5/2003 | Pursley | A45F 5/00 224/234 |
| 6,659,317 | B2 * | 12/2003 | Borson | A45F 5/00 224/183 |
| 6,679,465 | B1 * | 1/2004 | Leasure | F41B 5/14 124/23.1 |
| 6,691,374 | B2 * | 2/2004 | Coyne | A45F 5/02 24/3.1 |
| 6,726,162 | B1 * | 4/2004 | Winter | A01M 31/00 248/218.4 |
| 6,749,170 | B1 * | 6/2004 | Rhoads | F16M 13/00 124/86 |
| 6,857,544 | B2 * | 2/2005 | Dahl | A45F 3/14 224/148.4 |
| 6,966,314 | B2 * | 11/2005 | McPherson | F41B 5/105 124/25.6 |
| 7,047,601 | B1 * | 5/2006 | Vernon-Woods | A45F 5/02 24/3.12 |
| 7,152,595 | B1 | 12/2006 | Muhich | |
| 7,163,183 | B2 * | 1/2007 | Sutherland | F41B 5/14 124/23.1 |

(56) References Cited

U.S. PATENT DOCUMENTS

| | | | | |
|---|---|---|---|---|
| 7,175,031 B2* | 2/2007 | Matthews | B25H 3/04 | 211/70.6 |
| 7,175,061 B2* | 2/2007 | Dohn | A45F 5/02 | 224/241 |
| 7,290,689 B2* | 11/2007 | Oxley | F41B 5/1461 | 224/270 |
| 7,314,153 B2* | 1/2008 | Musarella | A45F 5/02 | 224/247 |
| 7,314,199 B1* | 1/2008 | Ward | F41B 5/14 | 248/150 |
| 7,744,053 B2* | 6/2010 | Perman | A45F 5/02 | 248/312 |
| 7,748,583 B1* | 7/2010 | Woltman | A45D 20/12 | 224/242 |
| 7,802,706 B1* | 9/2010 | Selsor | A45F 5/02 | 224/269 |
| 7,841,653 B2* | 11/2010 | Sanchez | B60N 2/2845 | 24/3.12 |
| 7,857,279 B2* | 12/2010 | Krasnicki | A45F 3/44 | 124/86 |
| 7,950,554 B2* | 5/2011 | Hoffner | A45F 5/02 | 224/222 |
| 8,231,094 B1* | 7/2012 | Barnes, Jr. | A47G 23/0225 | 224/148.4 |
| 8,341,808 B2* | 1/2013 | Vermillion | A45F 5/02 | 24/336 |
| 8,347,869 B2 | 1/2013 | Sims et al. | | |
| 8,490,845 B2* | 7/2013 | Stewart | B25H 3/006 | 224/197 |
| 8,814,018 B1* | 8/2014 | Mozes | F41B 5/1453 | 224/625 |
| 9,944,209 B1* | 4/2018 | Carnevali | F16M 13/022 | |
| 10,022,855 B2* | 7/2018 | Hintze | B25H 3/04 | |
| 2002/0066759 A1* | 6/2002 | Oxley | F41B 5/1461 | 224/270 |
| 2002/0170933 A1* | 11/2002 | Martin | A45F 5/02 | 224/197 |
| 2004/0040991 A1* | 3/2004 | McCoy | A45F 5/00 | 224/251 |
| 2004/0108346 A1* | 6/2004 | Pablo | A45F 5/02 | 224/251 |
| 2004/0159756 A1* | 8/2004 | Albertson | A45C 13/38 | 248/227.1 |
| 2004/0200867 A1* | 10/2004 | Chee | A45F 5/00 | 224/197 |
| 2006/0237508 A1* | 10/2006 | Kaplan | A45C 1/04 | 224/674 |
| 2007/0017945 A1* | 1/2007 | Willis | A45F 3/14 | 224/270 |
| 2007/0045372 A1* | 3/2007 | Cangemi, Jr. | A45F 5/02 | 224/673 |
| 2007/0099469 A1* | 5/2007 | Sorensen | A45F 5/02 | 439/289 |
| 2007/0125819 A1* | 6/2007 | Kahn | B25H 3/006 | 224/665 |
| 2007/0170220 A1* | 7/2007 | Fragassi, III | A45F 5/02 | 224/660 |
| 2007/0193007 A1* | 8/2007 | Otrusina | A45F 5/02 | 24/572.1 |
| 2008/0083798 A1* | 4/2008 | Broadwell | A45F 5/02 | 224/269 |
| 2008/0104801 A1* | 5/2008 | Yeh | A45F 5/02 | 24/3.12 |
| 2008/0104802 A1* | 5/2008 | Vermillion | A45F 5/02 | 24/3.12 |
| 2008/0272269 A1* | 11/2008 | Moravsky | A45F 5/02 | 248/692 |
| 2009/0056688 A1* | 3/2009 | Marsh | F41B 5/14 | 124/1 |
| 2010/0133305 A1* | 6/2010 | Stewart | B25H 3/006 | 224/197 |
| 2011/0204113 A1* | 8/2011 | Reinarz | F41B 5/14 | 224/576 |
| 2011/0253757 A1* | 10/2011 | May, Jr. | A45F 3/08 | 224/268 |
| 2012/0043362 A1* | 2/2012 | Smith | F41B 5/1461 | 224/269 |
| 2012/0322338 A1* | 12/2012 | Gilbert | A63H 3/50 | 446/73 |
| 2013/0284775 A1* | 10/2013 | Byrnes | F41C 33/00 | 224/222 |
| 2014/0223796 A1* | 8/2014 | Coonrod | F41B 5/1453 | 42/94 |
| 2014/0284360 A1* | 9/2014 | Chorazewitz | A45F 5/02 | 224/148.7 |
| 2014/0346821 A1* | 11/2014 | Flis | A45F 5/021 | 297/188.04 |
| 2015/0084596 A1* | 3/2015 | Pickens | A45F 5/021 | 320/127 |
| 2015/0122856 A1* | 5/2015 | Pecotte | A45F 5/00 | 224/268 |
| 2015/0219417 A1* | 8/2015 | Billings | F41B 5/1461 | 224/576 |
| 2015/0237999 A1* | 8/2015 | Kinskey | A45F 5/021 | 224/660 |
| 2015/0351523 A1* | 12/2015 | West | A45F 5/02 | 224/269 |
| 2016/0051039 A1* | 2/2016 | Merzon | A45F 5/021 | 224/269 |
| 2016/0066677 A1* | 3/2016 | Asay | A45F 5/021 | 224/195 |
| 2016/0084608 A1* | 3/2016 | Camille | F41B 5/148 | 124/86 |
| 2016/0187096 A1* | 6/2016 | Hamlin | F41B 5/1461 | 224/257 |
| 2016/0302559 A1* | 10/2016 | Khan | A45F 5/06 | |
| 2017/0027312 A1* | 2/2017 | Stewart | A45F 5/02 | |
| 2017/0332771 A1* | 11/2017 | Tandeski | A45F 5/021 | |
| 2019/0021477 A1* | 1/2019 | Senn | A45F 5/021 | |

* cited by examiner

ARCHERY BOW SUPPORT DEVICE

RELATED APPLICATION

This application claims priority to U.S. Provisional Patent Application No. 62/490,167, which was filed on Apr. 26, 2017, the disclosure of which is incorporated herein by reference.

BACKGROUND

This disclosure relates to an archery bow support device and more particularly to an archery bow support device that allows the archery bow to be supported for an extended period of time.

In game hunting, an archer or a bow hunter may use a compound archery bow to shoot an arrow at an animal. The compound archery bow is a complicated device that consists of various components such as top and bottom limbs, limb dampeners, an idler wheel, a bottom cam, bow risers, an arrow shelf, a bow grip, a stabilizer mount, a bow string, bow cables, and a bow string suppressor. The bow hunter is in a stealth position, usually in camouflage or on a tree stand, in an attempt to be invisible to approaching game, such as deer. Prior to the deer being in range, the bow hunter will retrieve the compound bow from a bow stand or holder to be ready to shoot at the deer. However, the deer may take some time before the deer is within range of the bow hunter. It is then necessary for the hunter to remain still for an extended period of time holding the bow at the ready position. Any movement as the game approaches could alert the game cause the game to flee causing the hunter to miss an opportunity. Holding a compound bow, which may weigh at least 5 pounds, for a few minutes may result in severe arm fatigue. This may cause the hunter's arm to shake resulting in the hunter missing or only wounding the game. As can be appreciated, it would be beneficial if any arm fatigue or shaking could be avoided when shooting at game to protect against any errant shots.

Therefore, it would be desirable to have an archery bow support device that allows a hunter to support an archery bow in a position in which the hunter is ready to shoot an arrow from the archery bow. It would also be desirable to have an archery bow support device that allows a hunter to support an archery bow and to pivot the archery bow to track an animal that is being targeted by the hunter. It would also be advantageous to have an archery bow support device that allows a hunter to support an archery bow for an extended period of time to allow an animal to come into range of the hunter.

BRIEF SUMMARY

In one form of the present disclosure, an archery bow support device comprises a clip portion have a front leg having a front surface and a back leg and a support bracket connected to the front surface of the front leg and extending outwardly from the front leg.

In another form of the present disclosure, an archery bow support device comprises a clip portion have a front leg having a front surface and an end portion and a back leg, and a support bracket connected to the end portion of the front leg by a hinge device for allowing the support bracket to pivot relative to the front leg and the support bracket extending outwardly from the front leg.

In yet another form of the present disclosure, an archery bow support device is disclosed which comprises a clip portion have a front leg having a front surface and a back leg having an interior surface, a catch positioned on the interior surface of the back leg, and a support bracket connected to the front surface of the front leg and extending outwardly from the front leg.

The present disclosure provides an archery bow support device that allows the archery bow to be supported for an extended period of time.

The present disclosure provides an archery bow support device that is capable of being easily positioned on a belt or pants of an individual and that may be easily removed from the belt or pants after use.

The present disclosure provides an archery bow support device that is lightweight, easy to handle, easy to install, easy to use, and easy to remove.

The present disclosure also provides an archery bow support device which is of simple construction and design and which can be easily employed with highly reliable results.

The present disclosure is also directed to an archery bow support device that does not require any special tools to attach the device to an archery bow or to an individual during use.

The present disclosure is also directed to an archery bow support device that may be made of a lightweight material such as plastic, polyethylene, and high density polyethylene or any other similar material.

The present disclosure is further related to an archery bow support device that pivots for moving the archery bow during use to track a randomly moving animal during targeting of the animal.

The present disclosure is directed to an archery bow support device that may comprise many different colors or patterns to provide an attractive device, a camouflaged device, or a stealth device.

The present disclosure is related to an archery bow support device that may be positioned on any sized belt or pants.

The present disclosure is directed to an archery bow support device that does not interfere with the use of the archery bow.

The present disclosure is related to an archery bow support device that comprises a catch mechanism for holding or securing the device on a belt or on pants of the individual using the device.

The present disclosure is also related to an archery bow support device that allows an archery bow to be placed into the archery bow support device and allows the archery bow to be easily removed from the archery bow support device after use.

The present disclosure is further directed to an archery bow support device that allows an archery bow to be supported in an upright position for the archer to be ready to use the archery bow.

These and other advantages of the present disclosure will become apparent after considering the following detailed specification in conjunction with the accompanying drawings, wherein:

DETAILED DESCRIPTION OF A PREFERRED EMBODIMENT

Figure 1:
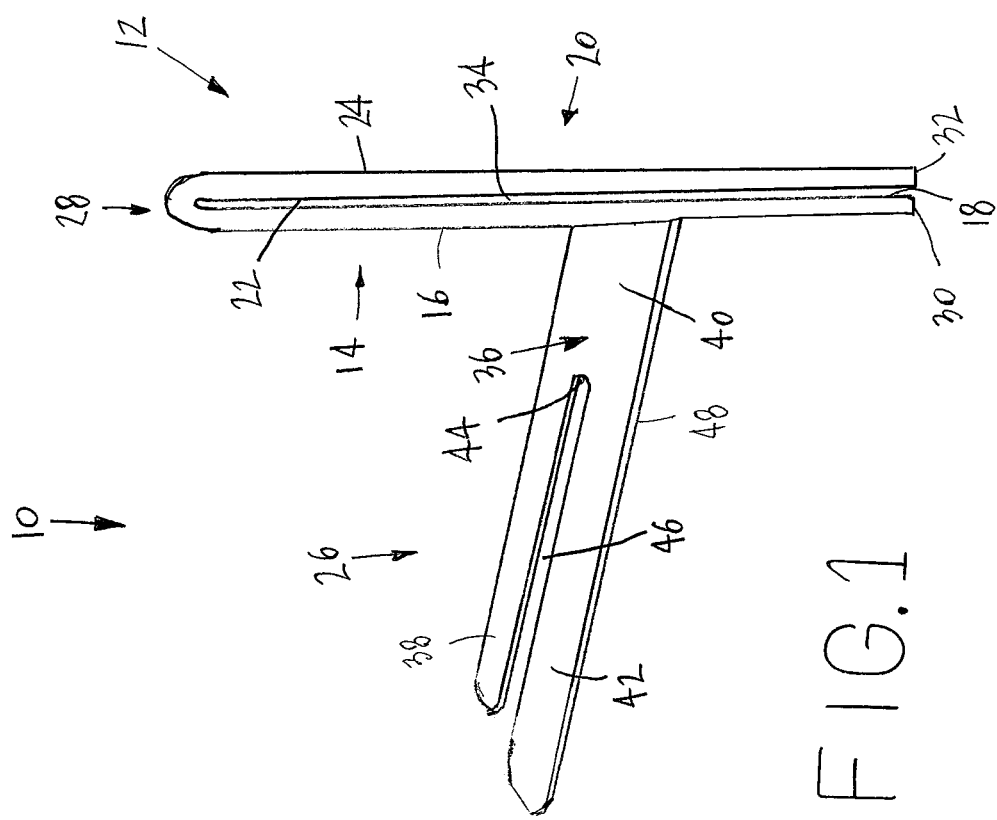
FIG. 1 is a side perspective view of an archery bow support device constructed according to the present disclosure.

Referring now to the drawings, wherein like numbers refer to like items, number 10 identifies an archery bow support device constructed according to the present disclosure. With reference now to FIG. 1, the device 10 comprises a clip portion or body 12 that has a front leg 14 having a front surface 16 and a back surface 18, a back leg 20 having an interior surface 22 and an exterior surface 24, and a support bracket 26 connected to the front surface 16 of the front leg 14 and extending outwardly from the front leg 14. The front leg 14 and the back leg 20 are connected together by a top connecting member 28, which is generally U-shaped. The connecting member 28 allows the legs 14 and 20 to spring away from each other when using the clip portion 12. The front leg 14 has an end portion 30 and the back leg 20 has an end portion 32. The end portions 30 and 32 may be spread apart to receive a belt or pants, as will be explained in detail further herein. The clip portion 12 has a space or void 34 defined between the legs 14 and 20 and the top connecting member 28. The space 34 is used to receive a belt or pants during use.

The support bracket 26 has an upper surface 36 having a first prong or leg portion 38, a center member 40, and a second prong or leg portion 42. The center member 40 is connected to the front surface 16 of the first leg 14. The center member 40 has a front surface or edge 44. The prongs 38 and 42 and the front surface 44 define a space or a void 46 in which a portion of an archery bow may be inserted during use. The support bracket 26 also has a bottom surface 48. Also, the support bracket 26 may be angled upwardly relative to the front surface 16 of the first leg 14. This assists in further supporting a portion of an archery bow inserted into the void 46.

Figure 2:
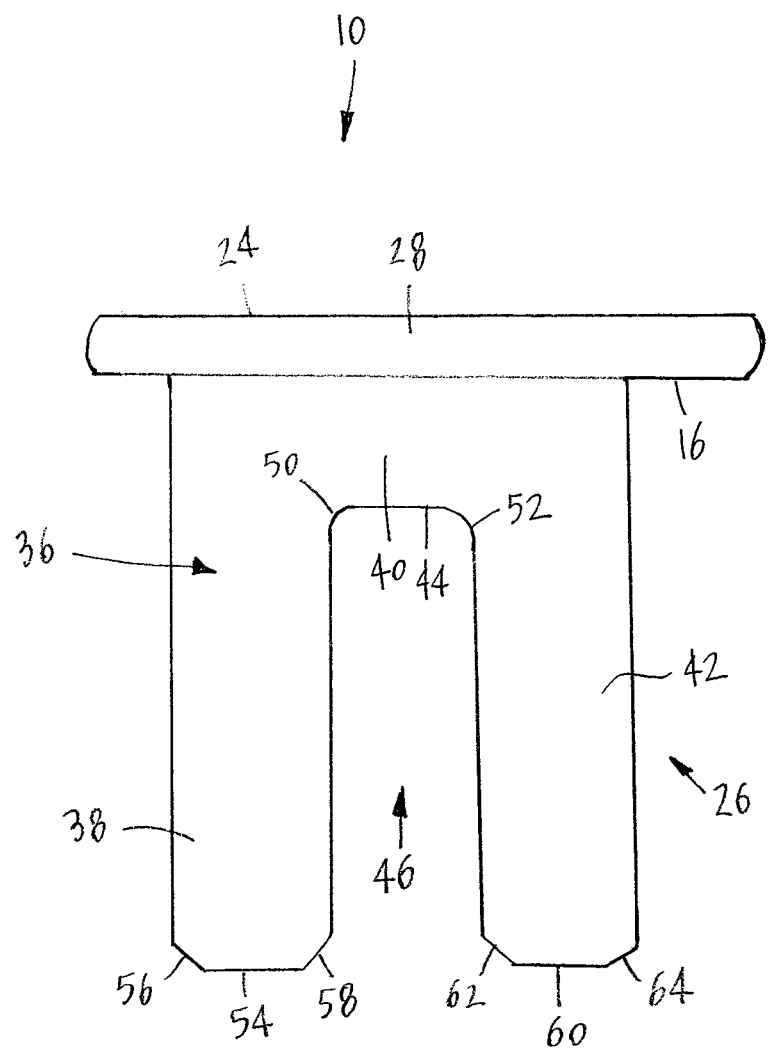
FIG. 2 is a top view of the archery bow support device constructed according to the present disclosure.

FIG. 2 shows a top view of the archery bow support device 10 constructed according to the present disclosure. The archery bow support device 10 has the front surface 16, the connecting member 28, the exterior surface 24, and the support bracket 26. The support bracket 26 has the upper surface 36, the first prong 38, the center member 40, the second prong 42, and the front surface 44. The front surface 44 has a first rounded corner 50 as part of the first prong 38 and a second rounded corner 52 as part of the second prong 42. The first prong 38 has a first prong end 54 having a first rounded or chamfered edge 56 and a second rounded or chamfered edge 58. The second prong has a second prong end 60 having a first rounded or chamfered edge 62 and a second rounded or chamfered edge 64. The rounded or chamfered edges 58 and 62 act as a guide to direct or position a portion of an archery bow (not shown) into the space 46.

Figure 3:
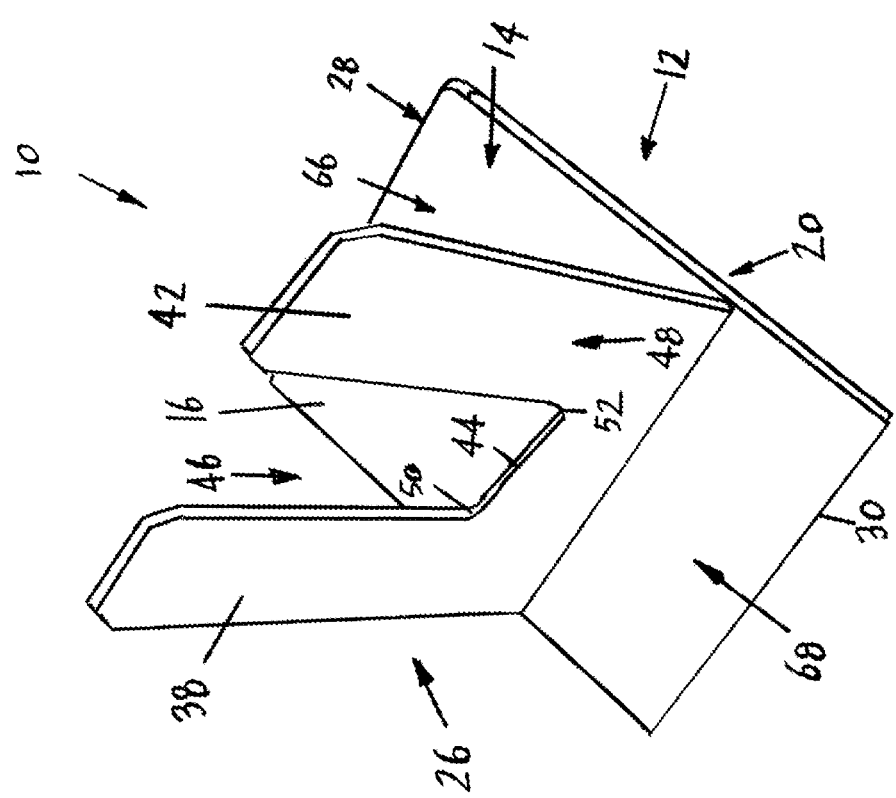
FIG. 3 is a bottom perspective view of the archery bow support device constructed according to the present disclosure.

With reference now to FIG. 3, a bottom perspective view of the archery bow support device 10 is illustrated. The archery bow support device 10 comprises the clip portion or body 12 that has the front leg 14 having the front surface 16, and the support bracket 26 connected to the front surface 16 of the front leg 14 and extending outwardly from the front leg 14. The front leg 14 and the back leg 20 are connected together by the top connecting member 28. The connecting member 28 allows the legs 14 and 20 to spring away from each other when using the clip portion 12. The front leg 14 also has an upper section 66 and a lower section 68. The upper section 66 is defined between the support bracket 26 and the top connection member 28 on the front surface 16. The lower section 68 is defined between the support bracket 26 and the end portion 30 on the front surface 26. As will be discussed more fully herein, the lower section 68 may be used to be positioned against a belt (not shown) to secure the device 10 in place.

The support bracket 26 has bottom surface 48 having the first prong or leg portion 38, the center member 40, and the second prong or leg portion 42. The center member 40 is connected to the front surface 16 of the first leg 14. The center member 40 has a front surface or edge 44. The prongs 38 and 42 and the front surface 44 define a space or a void 46 in which a portion of an archery bow may be inserted during use. Also, the support bracket 26 may be angled upwardly relative to the front surface 16 of the first leg 14. This assists in further supporting a portion of an archery bow inserted into the void 46.

Figure 4:
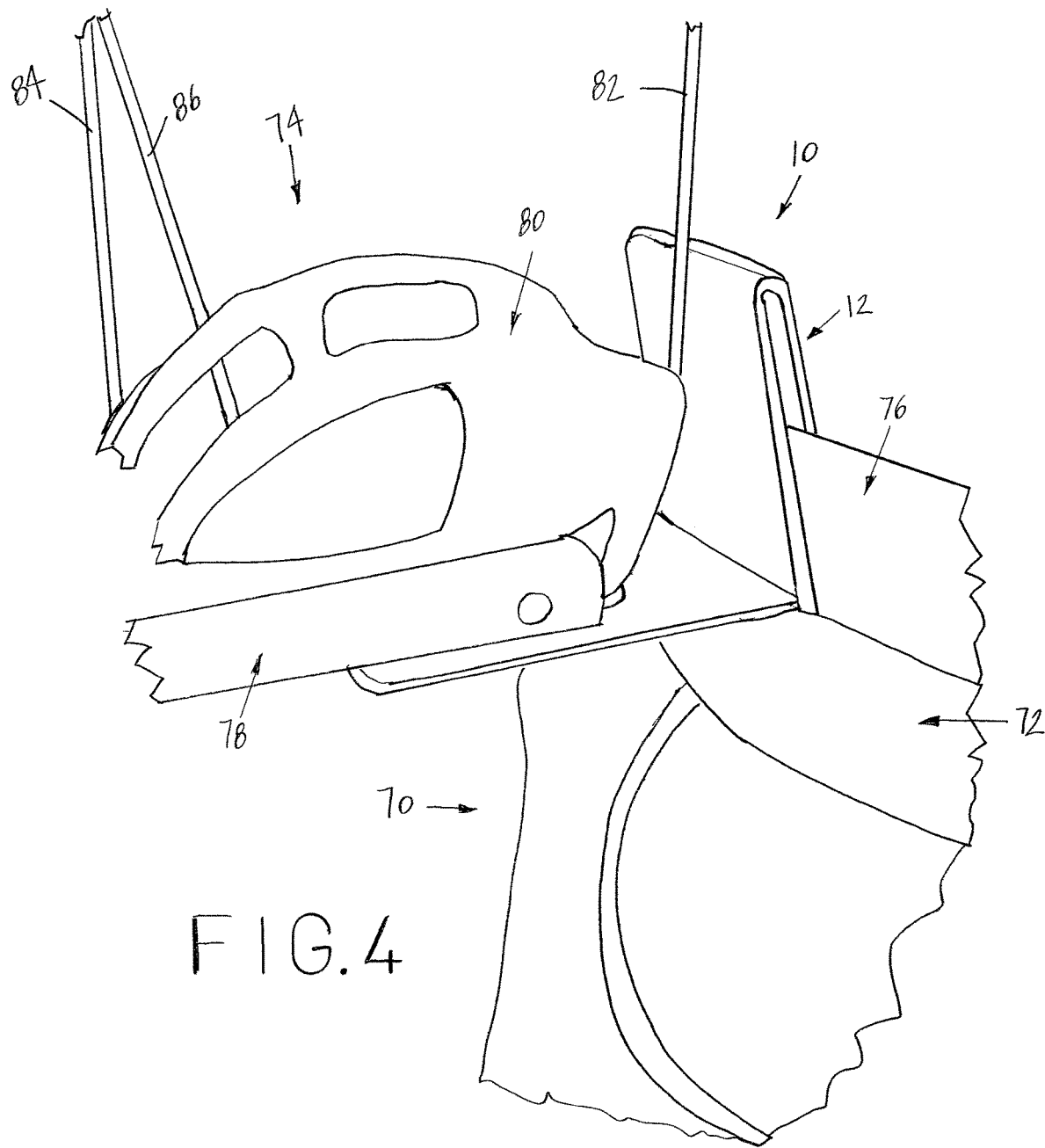
FIG. 4 is a side perspective view of the archery bow support device constructed according to the present disclosure in use by an individual.

FIG. 4 depicts the archery bow support device 10 being placed on a pair of pants 70, behind a belt 72, and having a compound bow 74 being supported by the device 10. The device 10 has an upper band 76 of the pants 70 captured within the space 34 of the clip portion 12 of the device 10. The lower section 68 of the device 10, which is not visible in this particular view, is captured or tucked behind the belt 72. As can be appreciated, the compound bow 74 is shown having a bottom limb portion 78 that is positioned on the second prong 42 and a bottom cam 80 is positioned within the space 46 to not interfere with the operation of the bottom cam 80. The compound bow 74 also has a bow string 82 that may rest against the upper section 66 of the device 10. The compound bow 74 further has a pair of bow cables 84 and 86 that do not contact the device 10 at all and are free to operate. It is also contemplated that the device 10 may be positioned over the belt 72. As can be appreciated, in order to use the device 10 the individual placed the clip portion 12 onto the upper band 76 of the pants 70 and positions the lower section 68 behind the belt 72. The device 10 is ready to receive the compound bow 74. In order to remove the device 10, the compound bow 74 is removed from the device 10 and the device 10 is then easily removed from the pants 70.

Figure 5:
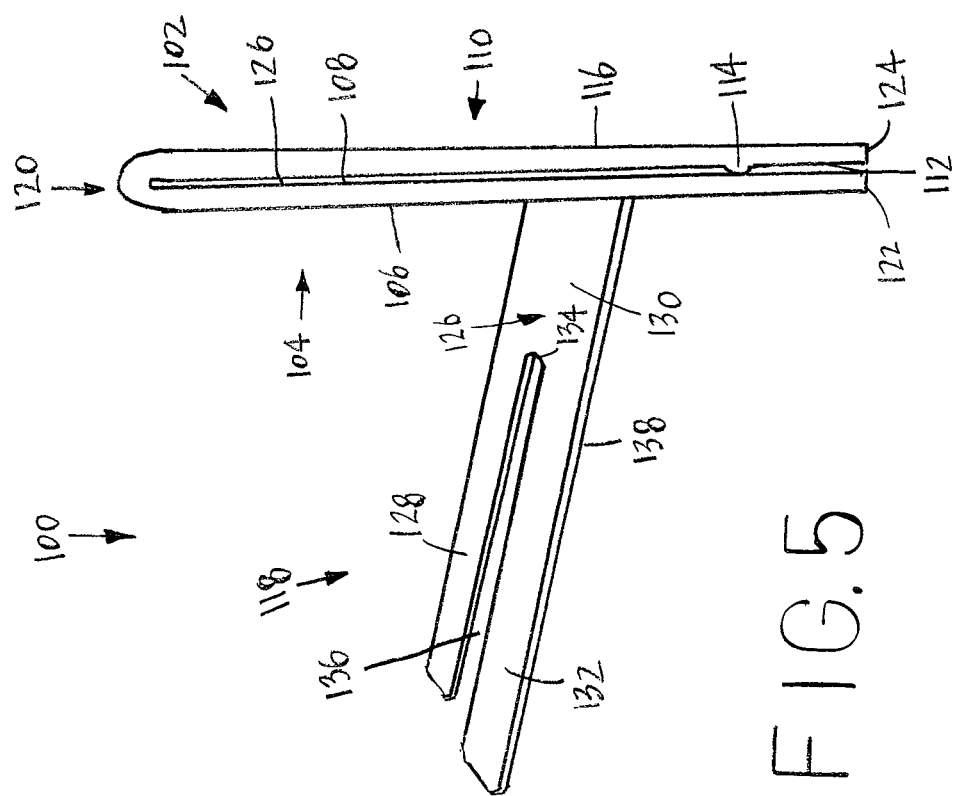
FIG. 5 is a side perspective view of another preferred embodiment of an archery bow support device constructed according to the present disclosure.

Referring now in particular to FIG. 5, another embodiment of an archery bow support device 100 constructed according to the present disclosure is shown. The archery bow support device 100 comprises a clip portion or body 102 that has a front leg 104 having a front surface 106 and a back surface 108, a back leg 110 having an interior surface 112 having a catch mechanism or device 114, an exterior surface 116, and a support bracket 118 connected to the front surface 106 of the front leg 104 and extending outwardly from the front leg 104. The catch mechanism 114 is used to further grip or secure the device 100 to pants or a belt. The catch mechanism 114 may extend the length of the back leg 110 or a portion thereof. The front leg 104 and the back leg 110 are connected together by a top connecting member 120, which is generally U-shaped. The connecting member 120 allows the legs 104 and 110 to spring away from each other or open when using the clip portion 102. The front leg 104 has an end portion 122 and the back leg 20 has an end portion 124. The end portions 122 and 124 may be spread apart to receive a belt or pants. The clip portion 102 has a space or void 126 defined between the legs 104 and 110 and the top connecting member 120. The space 126 is used to receive a belt or pants during use.

The support bracket 118 has an upper surface 126 having a first prong or leg portion 128, a center member 130, and a second prong or leg portion 132. The center member 130 is connected to the front surface 106 of the first leg 104. The center member 130 has a front surface or edge 134. The prongs 128 and 132 and the front surface 134 define a space or a void 136 in which a portion of an archery bow may be inserted during use. The support bracket 118 also has a bottom surface 138. Also, the support bracket 118 may be angled upwardly relative to the front surface 106 of the first leg 104. This assists in further supporting a portion of an archery bow inserted into the void 136.

Figure 6:
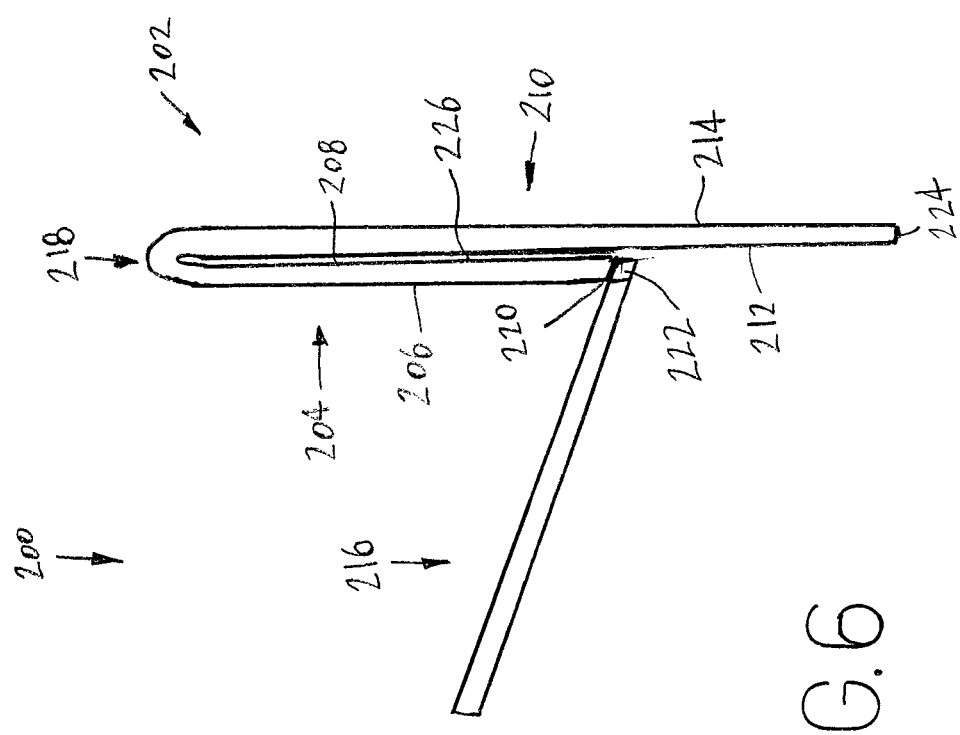
FIG. 6 is a side perspective view of still another preferred embodiment of an archery bow support device constructed according to the present disclosure.

FIG. 6 illustrates another embodiment of an archery bow support device 200 constructed according to the present disclosure. The archery bow support device 200 comprises a clip portion or body 202 that has a front leg 204 having a front surface 206 and a back surface 208, a back leg 210 having an interior surface 212 and an exterior surface 214, and a support bracket 216 connected to the front surface 206 of the front leg 204 and extending outwardly from the front leg 204. The front leg 204 and the back leg 210 are connected together by a top connecting member 218, which is generally U-shaped. The connecting member 218 allows the legs 204 and 210 to spring away from each other when using the clip portion 202. The front leg 204 has an end portion 220 to which a hinge device 222 is used to connect the support bracket 216 to the end portion 220 of the leg 204. In this manner, the support bracket 216 may pivot or close after use of the device 200 to store the device 200. The support bracket 216 may be positioned in an open position to use the device 200, as is shown in FIG. 6, or a close position to store the device 200. It is also possible that the support bracket 216 may be disconnected from the hinge device 222 to replace the support bracket 216 with another support bracket having longer prongs that may be used for bows having larger cams. The back leg 210 also has an end portion 224. The length of the back leg 210 is greater than the length of the front leg 204. The end portions 220 and 224 may be spread apart to receive a belt or pants in order to secure the device 200 to an individual during use. The clip portion 202 has a space or void 226 defined between the legs 204 and 210 and the top connecting member 218. The space 226 is used to receive a belt or pants during use.

In order to use the device 200 an individual will position the support bracket 216 into the open position and place the clip portion 202 over the upper band 76 of the pants 70 or the belt 72. The device 200 is ready to receive the compound bow 74. Once the bow 74 is in position, the individual will be able to support the bow 74 for an extended period of time while waiting for game to enter into target range. This allows the individual to track game while not alerting game that it is being hunted. In order to remove the device 200, the compound bow 74 is removed from the device 200, the support bracket 216 is moved to the close position by use of the hinge device 222, and the device 200 is then easily removed from the pants 70 or the belt 72.

Figure 7:
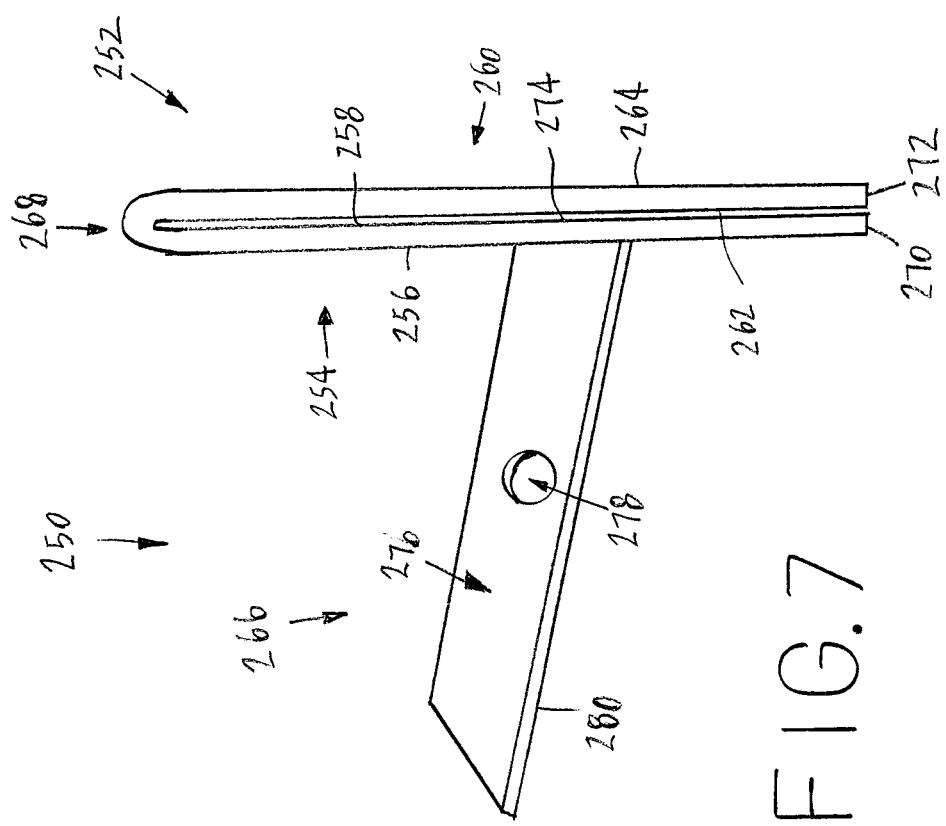
FIG. 7 is a top view of another preferred embodiment of an archery bow support device constructed according to the present disclosure.

With particular reference now to FIG. 7, a perspective view of another archery bow support device 250 is depicted. the device 250 comprises a clip portion or body 252 that has a front leg 254 having a front surface 256 and a back surface 258, a back leg 260 having an interior surface 262 and an exterior surface 264, and a support bracket 266 connected to the front surface 256 of the front leg 254 and extending outwardly from the front leg 254. The front leg 254 and the back leg 260 are connected together by a top connecting member 268, which is generally U-shaped. The connecting member 268 allows the legs 254 and 260 to spring away from each other when using the clip portion 252. The front leg 254 has an end portion 270 and the back leg 260 has an end portion 272. The end portions 270 and 272 may be spread apart to receive a belt or pants to use the device 250. The clip portion 252 has a space or void 274 defined between the legs 254 and 260 and the top connecting member 268. The space 274 is used to receive a belt or pants during use.

The support bracket 266 has an upper surface 276 having an aperture 278 formed therein. The aperture 278 allows an end of a long bow (not shown) to be placed therein to support the bow during use. It is also contemplated that the aperture 278 can be used to support a shotgun on a hip of an individual. The support bracket 266 also has a bottom surface 280. Also, the support bracket 266 may be angled upwardly relative to the front surface 256 of the first leg 254. This assists in further supporting a portion of an archery bow inserted into the aperture 278. As can be appreciated, the device 250 may be used in the following manner. The device 250 may be utilized by an individual by placing the clip portion 252 over the upper band 76 of the pants 70 or the belt 72. The device 250 is ready to receive a bow. Once the bow is in position, the individual will be able to support the bow for an extended period of time while waiting for game to enter into target range. This allows the individual to support the bow and not become fatigued. In order to remove the device 250, the bow is removed from the device 250 and the device 250 is then easily removed from the pants 70 or the belt 72.

From all that has been said, it will be clear that there has thus been shown and described herein an archery bow support device which fulfills the various advantages sought therefore. It will become apparent to those skilled in the art, however, that many changes, modifications, variations, and other uses and applications of the subject archery bow support device are possible and contemplated. All changes, modifications, variations, and other uses and applications which do not depart from the spirit and scope of the disclosure are deemed to be covered by the disclosure, which is limited only by the claims which follow.

What is claimed is:

1. A combination of an archery bow support device and an archery bow comprising:

the archery bow comprising a bottom limb portion and a bottom cam;

the archery bow support device comprising:

a clip portion having a front leg having a front surface having an upper section and a lower section, a front leg end portion, and a first length and a back leg having a second length with the first length and the second length being the same, the front leg and the back leg connected together by a top connecting member with the top connecting member allowing the front leg and the back leg to spring away from each other; and a support bracket connected to the front surface of the front leg between the upper section and the lower section of the front leg and extending outwardly from the front leg, the upper section defined between the support bracket and the top connecting member and the lower section defined between the support bracket and the front leg end portion, the support bracket comprising an upper planar surface having a first prong, a center section, and a second prong with the first prong and the second prong connected to the center section, the center section having a front edge having a first rounded corner adjacent to the first prong and a second rounded corner adjacent to the second prong and a straight portion between the first rounded corner and the second rounded corner, the first prong having a first prong end having a first chamfered edge, a first prong edge, and a second chamfered edge with the first prong edge being between the first chamfered edge of the first prong end and the second chamfered edge of the first prong end, the first prong having a first interior straight edge portion from the first rounded corner to the second chamfered edge of the first prong, and the second prong having a second prong end having a first chamfered edge, a second prong edge, and a second chamfered edge with the second prong edge being between the first chamfered edge of the second prong end and the second chamfered edge of the second prong end, the second prong having a second interior straight edge portion from the second rounded corner to the second chamfered edge of the second prong with the bottom limb portion positioned on the second prong and the bottom cam of the archery bow positioned between the first prong and the second prong.

2. The combination of an archery bow support device and an archery bow of claim 1 wherein the support bracket further comprises a bottom planar surface having the first prong, the center section, and the second prong.

3. The combination of an archery bow support device and an archery bow of claim 1 wherein the support bracket is angled upwardly from the front surface of the front leg.

4. The combination of an archery bow support device and an archery bow of claim 1 wherein the first prong has a length and the second prong has a length and the length of the first prong is equal to the length of the second prong.

5. The combination of an archery bow support device and an archery bow of claim 1 wherein the front edge of the center section defines a surface against which a portion of an archery bow is positioned during use.

6. The combination of an archery bow support device and an archery bow of claim 1 wherein the back leg has a back leg end portion.

7. The combination of an archery bow support device and an archery bow of claim 1 wherein the archery bow support device is constructed of plastic.

* * * * *